(12) United States Patent
Green et al.

(10) Patent No.: US 11,743,161 B2
(45) Date of Patent: Aug. 29, 2023

(54) CONTAINER NETWORK INTERFACE MONITORING

(71) Applicant: NetScout Systems, Inc, Westford, MA (US)

(72) Inventors: Jakob Green, Orem, UT (US); Jeevan Savant, Pleasant Grove, UT (US); Yogesh Ahire, Chelmsford, MA (US); Suhas Bhanushali, Westford, MA (US); Danny Lobo, San Jose, CA (US)

(73) Assignee: NetScout Systems, Inc., Westford, MA (US)

( * ) Notice: Subject to any disclaimer, the term of this patent is extended or adjusted under 35 U.S.C. 154(b) by 178 days.

(21) Appl. No.: 16/985,018

(22) Filed: Aug. 4, 2020

(65) Prior Publication Data

US 2021/0234785 A1    Jul. 29, 2021

Related U.S. Application Data

(60) Provisional application No. 62/966,383, filed on Jan. 27, 2020.

(51) Int. Cl.
| | |
|---|---|
| *H04L 43/0894* | (2022.01) |
| *H04L 43/04* | (2022.01) |
| *H04L 47/31* | (2022.01) |
| *H04L 47/35* | (2022.01) |
| *H04L 49/9057* | (2022.01) |
| *H04L 43/12* | (2022.01) |

(52) U.S. Cl.
CPC .......... *H04L 43/0894* (2013.01); *H04L 43/04* (2013.01); *H04L 47/31* (2013.01); *H04L 47/35* (2013.01); *H04L 49/9057* (2013.01); *H04L 43/12* (2013.01)

(58) Field of Classification Search
CPC ..... H04L 43/0894; H04L 43/04; H04L 47/31; H04L 47/35; H04L 49/9057; H04L 43/12
See application file for complete search history.

(56) References Cited

U.S. PATENT DOCUMENTS

| | | | |
|---|---|---|---|
| 10,922,386 B1 * | 2/2021 | Li | G06F 21/53 |
| 2017/0147522 A1 * | 5/2017 | Yu | G06F 13/4022 |
| 2020/0193016 A1 * | 6/2020 | Zeng | G06F 11/301 |
| 2020/0356397 A1 * | 11/2020 | Kumatagi | H04L 45/02 |
| 2021/0029170 A1 * | 1/2021 | Gupta | H04L 63/20 |

* cited by examiner

*Primary Examiner* — Walter J Divito
*Assistant Examiner* — Anthony Luo
(74) *Attorney, Agent, or Firm* — Foley & Lardner LLP

(57) ABSTRACT

A system and method of accessing a container environment having one or more containers is provided. The method of the disclosure includes receiving the container network namespace assigned to the container as established in a container runtime, switching from a host container network namespace to the container network namespace of the container, opening the container network interface of the container network namespace for allowing access to packets received or transmitted by the container network interface, and accessing the packets.

21 Claims, 9 Drawing Sheets

CONTAINER NETWORK INTERFACE MONITORING

CROSS REFERENCE TO RELATED APPLICATIONS

This application claims priority to U.S. Patent Application Ser. No. 62/966,383, filed Jan. 27, 2020 which is incorporated herein by reference in its entirety.

FIELD OF THE DISCLOSURE

The disclosed embodiments generally relate to container network interface monitoring, and more particularly to a system and method for container network interface monitoring by switching to the container network namespace for monitoring packets.

BACKGROUND OF THE DISCLOSURE

Container networking is controlled through software defined networking to connect containers together. Different solutions are available for setting up a container network. Kubernetes™ is an example of a popular distributed container framework for orchestration and management. Container frameworks such as Kubernetes do not themselves define a single networking implementation, rather they define a networking model that can be implemented by multiple methods. Kubernetes can work with tens of different network options, such as pods, that satisfy the Kubernetes networking model.

When monitoring container networks, challenges arise integrating with the different network options with which the container networks may be working. Some examples of Kubernetes network options that use different protocols are Flannel™ that has a bridge network, EKS™ that uses a custom ENI-based virtual network, AKS™ that uses a custom virtual network, Silk™ that utilizes Linux™ Kernel routing and Iptables, etc. Many Kubernetes network options do not have an ability for built-in taps that would be used for monitoring. Additionally, portions of a container framework may not be visible to the network option with which it is working. For example, Kubernetes' smallest object is a group of containers that share a network namespace called a pod. The namespace of the containers in the pod is referred to as a pod network namespace. Container-to-container traffic within a pod is not visible to the network option with which it is working, since Kubernetes uses a loopback device that is included within a different network namespace that is not included in the network option.

Some Kubernetes network options create a bridge device that allows the containers to communicate with one another as well as an overlay network to communicate with containers on other machines. It is only possible to monitor this bridge device to access pod-to-pod traffic for some network options, whereas it is not possible for others. In accordance with other solutions used by container frameworks, there is no bridge device or central point to capture traffic.

Conventional methods and systems for monitoring container network interface monitoring have generally been considered satisfactory for their intended purpose. However, there is still a need in the art for compatibility with different software defined network protocols, monitoring internal communication within a container, and the ability to select containers within a software defined network to monitor.

SUMMARY

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a monitoring system for monitoring a container network interface of a container network namespace is provided. The container network namespace is associated with a container of one or more containers, each container having a corresponding namespace. The monitoring system includes at least one memory configured to store instructions and at least one processor disposed in communication with the at least one memory, wherein the at least one processor upon execution of the instructions is configured to perform a method of the disclosure.

The method of the disclosure includes receiving the container network namespace assigned to the container as established in a container runtime, switching from a host container network namespace to the container network namespace of the container, opening the container network interface of the container network namespace for allowing access to packets received or transmitted by the container network interface, and accessing the packets.

In one or more embodiments, the method can further include establishing a main thread configured to receive the container network namespace assigned to respective established containers. The main thread can be configured to dispatch a packet capture thread for selected containers of the established containers, wherein the respective packet capture threads are configured to switch to the container network namespace of the container for which they were dispatched. The main thread can further be configured to execute the respective dispatched packet capture threads.

In one or more embodiments, the respective packet capture threads can be further configured to access the packets and share the packets with the main thread, and the main thread can be further configured to receive the packets accessed by the respective packet captured threads and process the packets.

In one or more embodiments, the respective packet capture threads can be further configured to open a container network interface of the container for which they were dispatched and provide a handle for accessing packets received or transmitted by the container network interface to the main thread. The wherein the main thread can be further configured to receive the handle provided by the respective packet captured threads, using the handle received by the respective packet captured threads, access the packets received or transmitted by the container network interface, and process the packets.

In one or more embodiments, the packet capture threads dispatched can all be included in one memory space of the at least one memory.

In one or more embodiments, the main thread can be included in the memory space of the at least one memory.

In one or more embodiments, the at least one processor can be further configured to share the packets with a monitoring processor that monitors the packets.

In one or more embodiments, the main thread can be further configured to share the packets with a remote central processor that monitors the packets.

In one or more embodiments, the respective packet capture threads can be further configured to shut themselves down when the container for they were respectively dispatched is no longer available.

In one or more embodiments, the main thread can be further configured to clean up the packet capture thread once it is shutdown.

In one or more embodiments, the main thread can be further configured to receive user input instructing the main thread which containers are selected and/or what to process in the packets.

In one or more embodiments, the method can further include switching from the container network namespace back to the host network namespace.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1A:
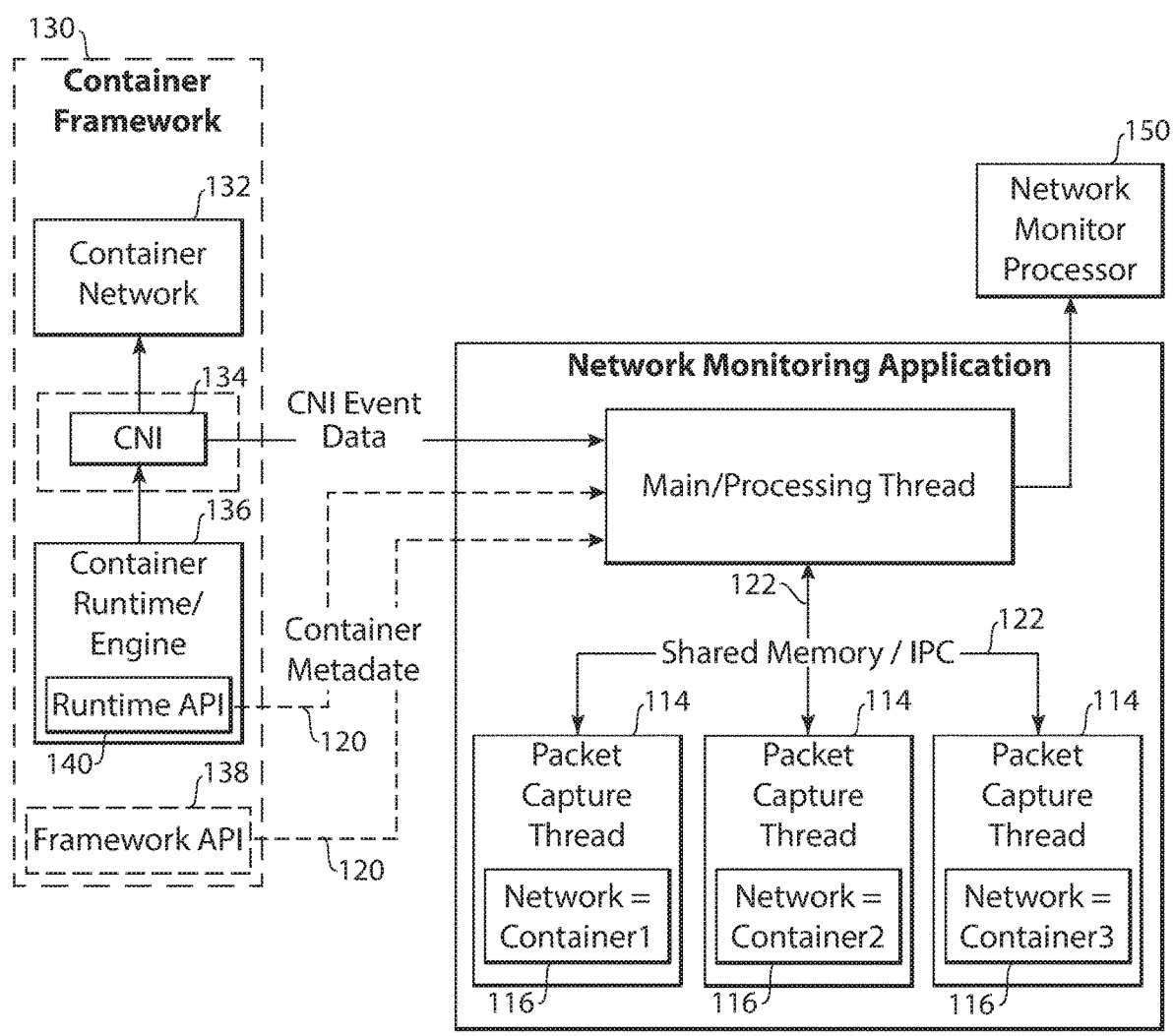
FIG. 1A illustrates a block diagram of an example network monitoring application included in a network system for interfacing with a container runtime to monitor container interfaces in a container framework in accordance with an aspect of the disclosure.

Reference will now be made to the drawings wherein like reference numerals identify similar structural features or aspects of the subject disclosure. For purposes of explanation and illustration, and not limitation, a block diagram of an exemplary embodiment of a network monitor system in accordance with the disclosure is shown in FIG. 1 and is designated generally by reference character 100. Other embodiments of the network monitor system 100 in accordance with the disclosure, or aspects thereof, are provided in FIGS. 2-8, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

The disclosure provides a method and system for monitoring internal communication within a container by switching to a container network namespace. By switching to the container network namespace, container network interfaces can be opened to capture inter-pod traffic. The solution is agnostic to different network options and virtual networks with which the container framework may be working.

The solution further provides the ability to select containers provided by the container framework to monitor.

A network monitoring application is provided that can switch between a host network namespace used by the network monitoring application and a container network namespace used by the containers. The network monitoring application communicates with a container runtime to learn information, e.g., the process ID, about the container to find a path to the container's network namespace.

By entering the container's network namespace, the network monitoring application is provided with visibility of internal communication within the container. This includes the ability to monitor the container network interfaces within the container network namespace, e.g., including the loopback device.

In accordance with one or more embodiments, the network monitoring application provides a main thread that can spawn a separate thread for every container network namespace that needs to be monitored. The threads are used to capture traffic and share the packets with the main thread, such as by using shared memory and inter-process communication.

Description of certain illustrated embodiments of the present disclosure will now be provided. With reference now to FIG. 1A, the network monitor system 100 is provided, with dotted lines designating elements that can be ancillary to the disclosure. Network monitor system 100 includes a network monitoring application 102, a container framework 130, and a network monitor processor 150 Network monitoring application 102 includes a main thread 110. In one or more embodiments, the network monitoring application 102 spawns packet capture threads 114 for respective containers of container network 132. The main thread 110 communicates with the container runtime 136 via a first communication link 120 and with the packet capture threads 114 via second respective communication links 122. In one or more embodiments, the main thread 110 switches back and forth between the host network namespace in which it operates and the container network namespace without spawning any packet capture threads 114, hence the packet capture threads 114 are shown in a dotted box 112 to indicate that they are provided in some embodiments, but may not be provided in other embodiments.

Network monitor application 102 and network monitor processor 150 can be implemented as one or more physical or virtual devices. The functionality of network monitor application 102 and network monitor processor 150 can be retrofitted to an existing network monitoring system that provides visibility into virtualized environments, such as vSTREAM™ and Adaptive Service Intelligence™ (ASI) of NetScout™ Systems, Inc. of Westford, Mass.

Network monitor processor 150 is configured to monitor packets provided by main thread 110. Network monitor processor 150 can further include or integrate with a mitigation device that can apply mitigation countermeasures to packets suspected or known to be illegitimate. Mitigation countermeasures can include, for example, blocking packets, redirecting the packets to a selected destination (such as a scrubbing device), and/or blacklisting the source (e.g., an IP address of the source) of the suspicious traffic. Blocked packets are not allowed to be transmitted to their intended destination (e.g., a destination IP address indicated in the individual packets). When the source of the suspicious packet is blacklisted, future packets from the same source IP address may be blocked.

Network monitor application 102 and network monitor processor 150 can be implemented as physical or virtual device(s) that use a local or remote processing device having hardware or firmware that executes software instructions, which enables performance of the disclosed functions. Additionally, network monitor application 102 and network monitor processor 150 can share one or more hardware, firmware, and/or software components.

Figure 1B:
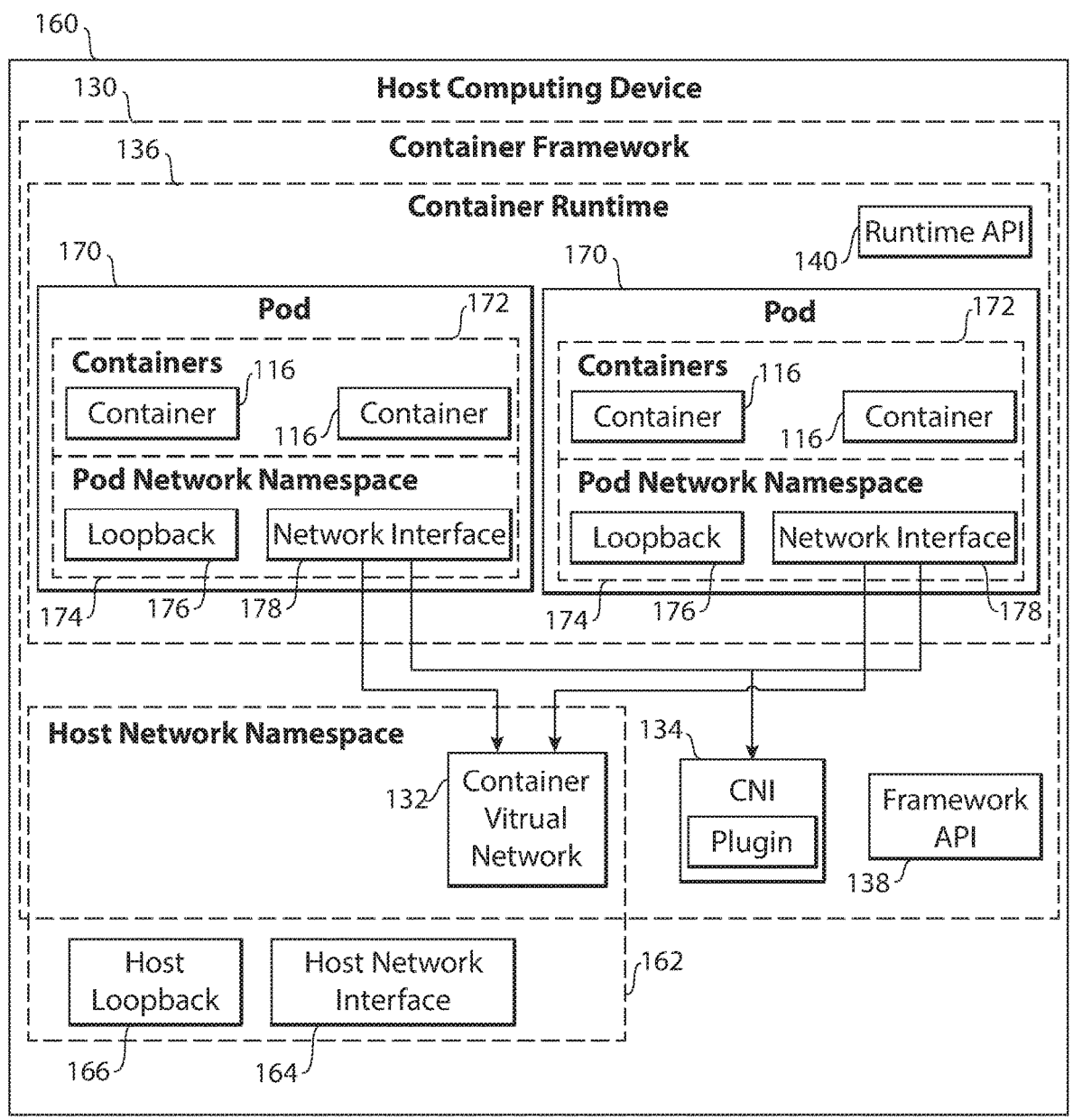
FIG. 1B illustrates a block diagram of an example host computing device having a container framework and container runtime in accordance with the disclosure.

Container framework 130 p can include one or more containers (such as containers 116 shown in FIG. 1B). A container is an isolated execution environment on an operating system host for an operating system such as Linux. The container behaves much like a full-featured operating system (e.g., Linux) installation with its own users, file system, processes, and network stack. When an application is run inside of a container it is isolated from its host and other containers provided with the same host. The isolation provides that even when the applications inside of a container is running as a root, it cannot access or modify files, processes, users, or other resources of the host or other containers of the host. Containers are implemented in the operating system kernel, thus sharing their resources with their host. An example container framework 130 is Kubernetes or Pivotal™ application service (PAS™) Container framework 130 includes a container network 132, a container network interface (CNI) 134 to setup container networking, a container runtime 136 and a framework application program interface (API) 138. The container runtime 136 further includes a runtime API 140.

Container runtime 136 sets up namespaces and groups (also referred to as cgroups) for containers and runs commands inside those namespaces and groups. The container network namespace is created by the container runtime 136 and then connected to the container network 132. With reference to the Kubernetes container framework example, Kubernetes uses container runtimes such as Docker™ cri-o™, rkt™. Container runtime 136 can provide namespace and metadata information about containers of a container network to the main thread 110 via one or more first communication links 120. Communication along first communication link(s) 120 can use, for example but without limitation, hypertext transport protocol (HTTP), secure HTTP (HTTPS), and Google's™ remote procedure call (gRPC).

Container framework 130 can receive a container creation request (see block 410 of FIG. 4), upon which container framework 130 calls the container runtime 136 to create a container. The container runtime 136 receives the container creation request and creates the container (shown in FIG. 2). The container runtime 136 further calls the CNI 134 to setup container networking. CNI 134 then invokes CNI plugins (shown in FIG. 2). CNI 134 is a standard that each container runtime 136 implements for a container framework 130. The CNI 134 is responsible for configuring communication between containers, also referred to as container networking. When a container is created or deleted the container runtime 136 invokes CNI plugins from a CNI config file. CNI plugins are provided with a container ID and a container's network namespace path. The CNI plugins implement a simple interface. For example, add, delete, and update may be the only commands that a CNI plugin is configured to implement.

In addition, a container runtime API 140 is provided that is unique to each container runtime 136. However, the container runtime API 140 may not give network namespace information. The CNI 134 does not provide all the container metadata. In order to get all labels, annotation, image name, and container name, a framework API 138 or an interface for the container runtime 136 would need to be used. The container metadata is needed to correlate traffic with a container. Without the container metadata, an administrator would merely see IP addresses interacting with each other in a rapidly changing ephemeral environment. The container runtime 136 and container framework 130, rather than the CNI 134, have the full container metadata.

FIG. 1B shows a host computing device 160 executing an operating system, such as Linux. Linux is provided as an example, but the disclosure is not limited to a specific operating system. The host computing device 160 has a host network namespace 162 and provides a host loop back device 162 and a host network interface 166. FIG. 1B shows the division between network namespaces and that the pods' respective network namespaces 174 are separate from the host's network namespace 162.

A container framework 130 is configured to execute on the host computing device 160. Container framework 130 overlaps host network namespace 162, but does not include host loop back device 166 and host network interface 164. Container framework includes CNI 134, container runtime 136, framework API 138, and a container network 132, which can optionally be a virtual container network, In the example shown, for illustration purposes only and without limitation, the container framework 130 is implemented as Kubernetes and the container runtime 136 is implemented as Docker. Container network 132 is included in both the container framework 130 and the host network namespace 162, whereas container runtime 136, CNI 134, and framework API 138 are excluded from the host network namespace 162.

Container runtime 136 includes one or more pods 170 and runtime API 140. Each pod 170 includes a container area 172 and a pod network namespace 174 that do not overlap with one another. Container area 172 includes one or more containers 116. Pod network namespace 174 includes a loopback device 176 and a pod network interface 178.

CNI 134 includes a CNI plugin 180 that configures the pod network interfaces 178 of the respective pods 170, and further collects information about the pod network namespace 174 and transfers the information to the network monitoring application 102. The CNI plugin information includes the container ID, the network namespace path, and configuration options for the plugins. The pod network interface 178 further exchanges information with the container network 132 that includes data transfer between pods or other devices (like the internet)

The pod network interface 178 uses the container network 132 as its means for network access. This network access includes access to other pods 170, machines on the same network, and potentially the internet.

With reference now to FIGS. 2-7, shown are flowcharts demonstrating implementation of the various exemplary embodiments. It is noted that the order of operations shown in FIGS. 2-7 is not required, so in principle, the various operations may be performed out of the illustrated order. Also certain operations may be skipped, different operations may be added or substituted, some operations may be performed in parallel instead of strictly sequentially, or selected operations or groups of operations may be performed in a separate application following the embodiments described herein.

Figure 2:
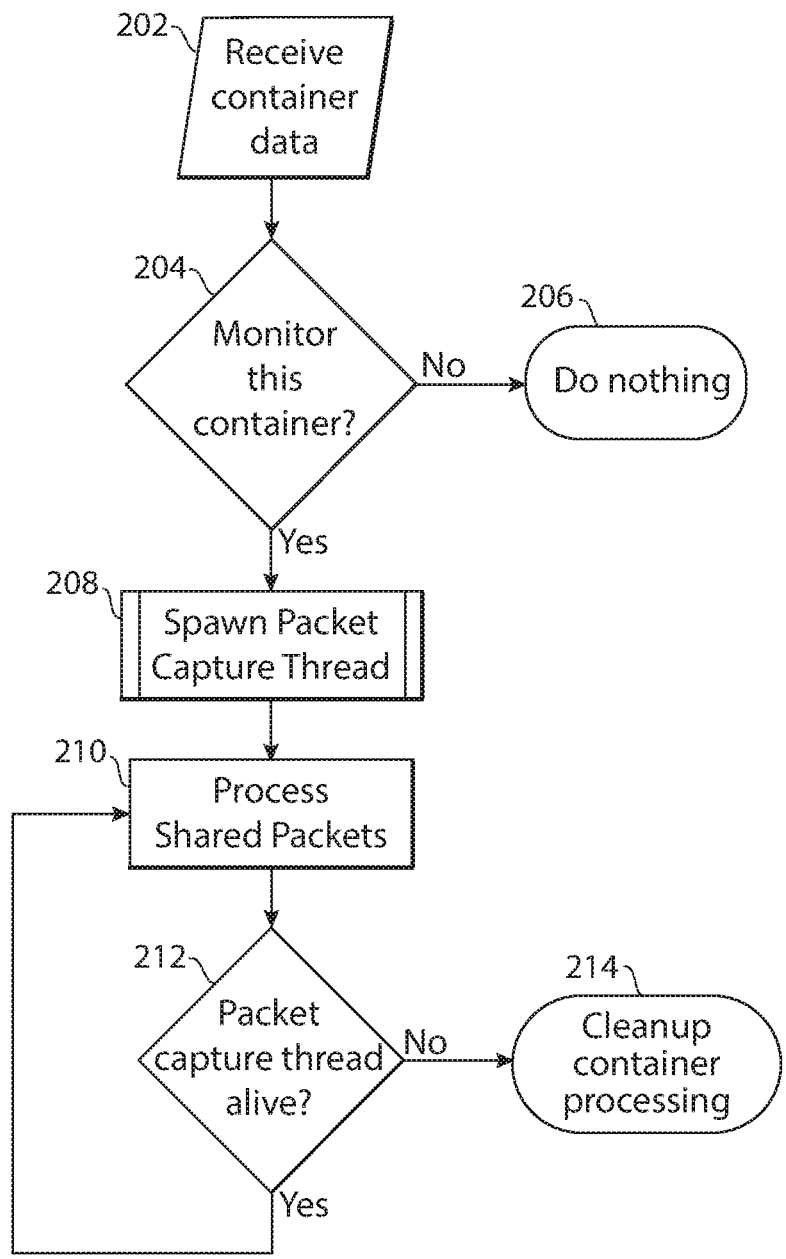
FIG. 2 is an example flowchart showing an example method performed by a main thread of the network monitoring application shown in FIG. 1, in accordance with an aspect of the disclosure.

Language that refers to the exchange of information is not meant to be limiting. FIG. 2 shows a flowchart 200 of operations performed by a main thread of a network monitoring application, such as the main thread 110 of network monitoring application 102 shown in FIG. 1.

With reference to FIG. 2, in one or more embodiments, at block 202, the main thread that receives container data and listens for CNI plugin information and fetches container metadata. At block 204, it is determined whether the container for which data was received at block 202 should be monitored (such as based on user preference entered by a user interface). If it is determined at block 204 that the container should not be monitored, the method continues at block 206. At block 206, the main thread does nothing. If it is determined at block 204 that the container should be monitored, the method continues at block 208. At block 208, the network monitoring application spawns a packet capture thread for the container, such as packet capture thread 114 shown in FIG. 1. At block 210, the main thread processes packets 210 until it is determined at block 212 that the packet capture thread is no longer alive. When it is determined at block 212 that the packet capture thread is no longer alive, the method continues at block 214. At block 214, container cleanup processing is performed.

With returned reference to FIG. 1, once spawned, a packet capture thread 114 can enter a different namespace, for example by using a Linux syscall "setns". When the packet capture thread 114 enters a container network namespace, the packet capture thread 114 can access the container network. The syscall will not affect a parent process's network. When the packet capture thread 114 is spawned by the main thread 110, the packet capture thread 114 can still have shared memory and interprocess communication (IPC) with the main thread 110. The main processing thread 110 can spawn multiple packet capture threads 114, each packet capture thread 114 entering the container network namespace of a different container while still being able to communicate with the main thread 110.

When monitoring a container within a pod, the main thread 110 of the network monitoring application 102 uses information from container runtime 136 to get a process ID of the container to be monitored. Using the process ID, the main thread 110 seeks a file that provides a path to a network namespace for the container (referred to as the container's network name space). This file, in the current example and without limitation, is the /proc/<process id>/ns/network file.

There are two methods for determining the container network namespace. Either the container runtime 136 provides the namespace information (if available through the runtime API) or the CNI 134 provides the namespace information. Since CNI 134 is only invoked when an event occurs, so there is no need for polling for creation and deletion events of the container.

Then the main thread 110 spawns a packet capture thread 114 and gives the packet capture thread 114 the path to the container network namespace. The packet capture thread 114 captures packets for only those interfaces within the container network namespace, for example the pods' loopback devices 176 and the pod's network interface 178 (shown in FIG. 1B).

When packets have been captured, by packet thread 110, the packet thread 110 uses IPC to communicate with the main thread 110 and share the packet data with the main thread 110 using shared memory.

Figure 3:
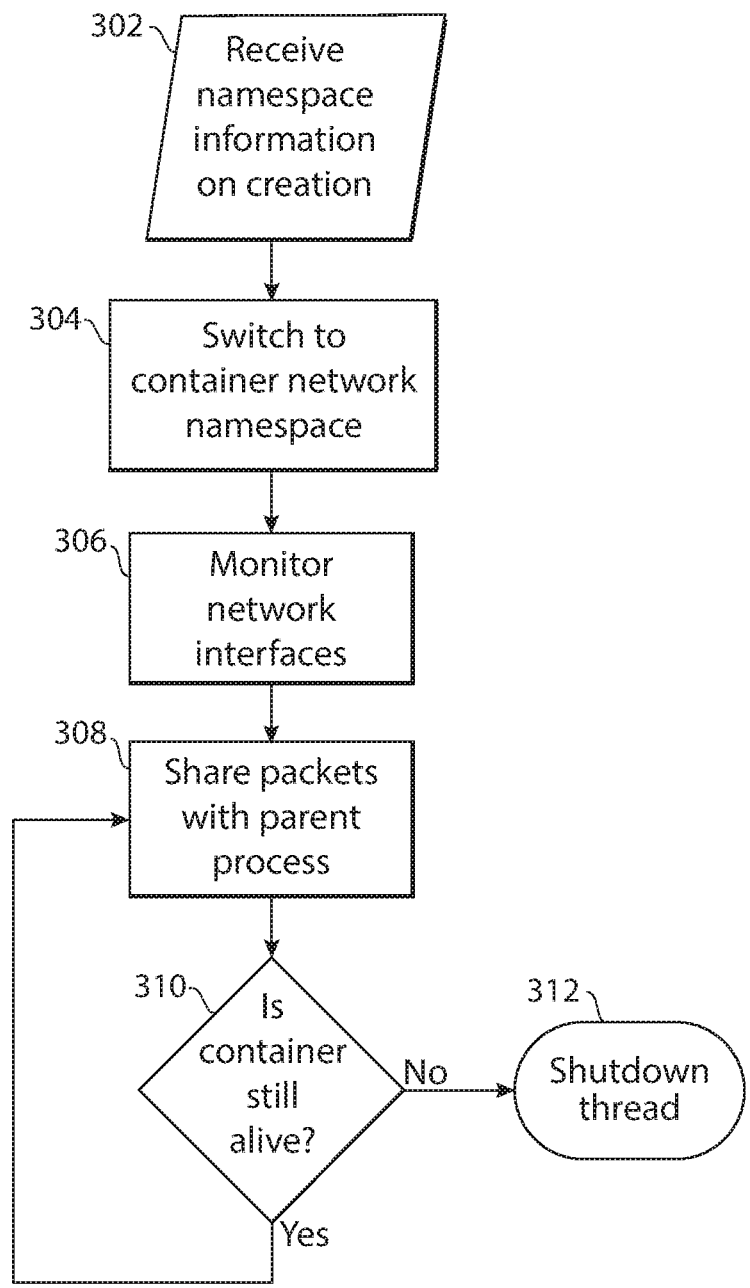
FIG. 3 is an example flowchart showing an example method performed by a spawned packet capture thread of the network monitoring application shown in FIG. 1, in accordance with an aspect of the disclosure.

FIG. 3 shows a flowchart 300 of operations performed by a packet capture thread, such as the packet capture thread 114 shown in FIG. 1. With reference to FIG. 3, in one or more embodiments, at block 302, the packet capture thread receives container namespace information on creation. At block 304, the packet capture thread switches to the container network namespace. At block 306, the packet capture thread monitors the container network interface. At block 308, the packet capture thread shares packets with the main thread. At block 310, the packet capture thread determines whether the container is still alive. If it is determined at block 310 that the container is still alive, the method continues at block 306 in order to monitoring the container network interface. If it is determined at block 310 that the container is no longer alive, the method continues at block 312. At block 312 the packet capture thread is shutdown.

Figure 4:
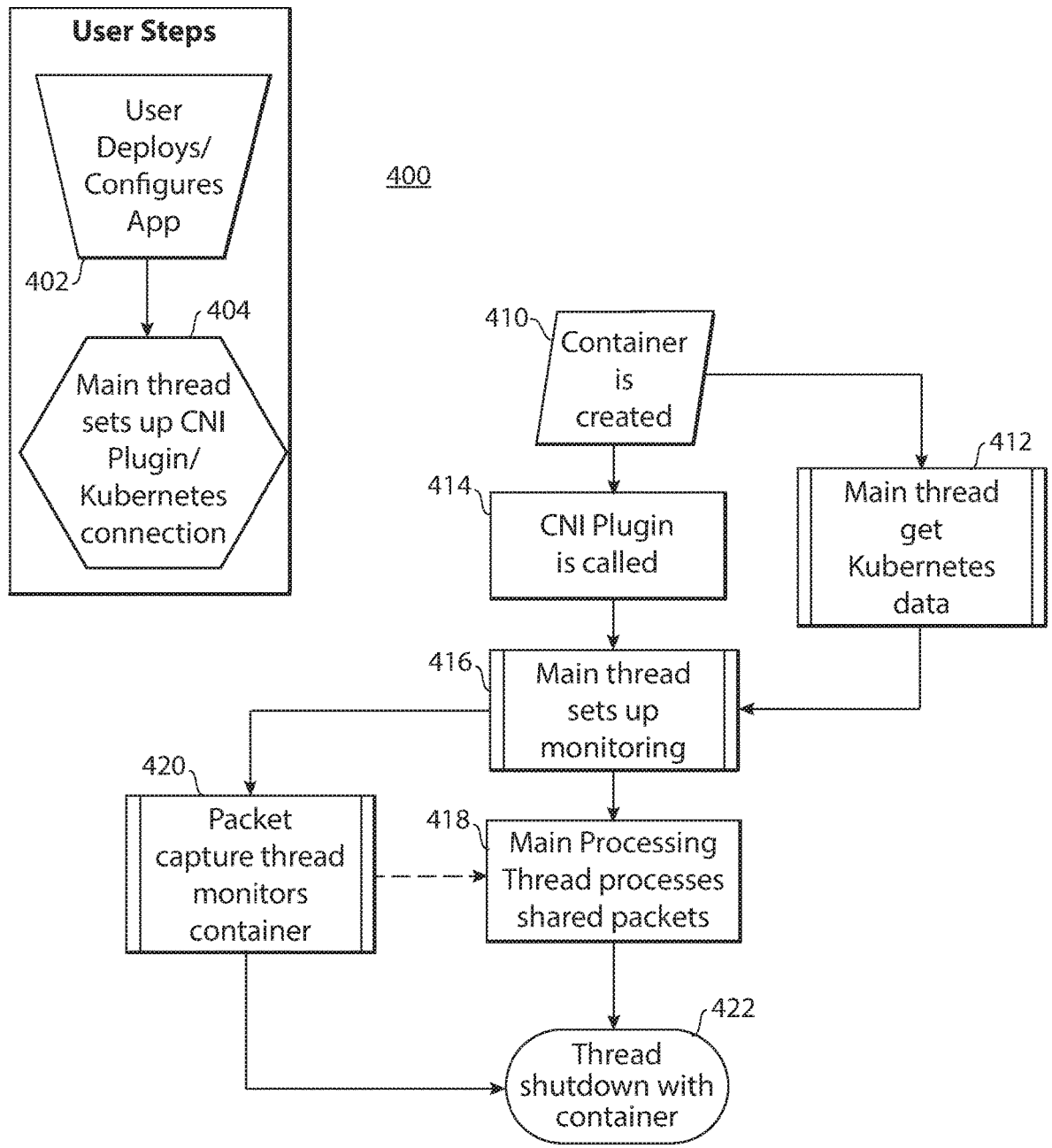
FIG. 4 is an example flowchart showing overall system flow of an example method performed by the network monitoring application shown in FIG. 1, in accordance with an aspect of the disclosure.

FIG. 4 shows a flowchart 400 of setting up a network monitoring application, such as network monitoring application 102 shown in FIG. 1, and monitoring a network by the network monitoring application. With reference to FIG. 4, in one or more embodiments, block 402 shows user steps that include blocks 404 and 406. At block 404, a user deploys and/or configures the network monitoring application and the main thread. Block 404 can be performed manually by the user. Block 406 is performed in preparation of network monitoring that includes monitoring a container network established by a container framework, such as container framework 130 shown in FIG. 1, which can be implemented, for example, as Kubernetes. At bock 406, a the main thread, such as main thread 110 shown in FIG. 1, sets up CNI plugins (for accessing the container networks interfaces) and container framework connections.

Once the network monitoring application is setup with the main thread setup to be connected to the container framework and the CNI plugins, at block 410 input is received to indicate that a container has been created in association with the container framework. At block 412, the main thread accesses container framework data. At block 414, which can be performed before, after, or while block 412 is performed, CNI plugin is called, which is provided to block 416. Upon performing both blocks 412 and 414, the method continues at block 416. At block 416, the main thread sets up monitoring, which can include spawning a new packet capture thread for each container created that is designated to be monitored.

At block 420, the packet capture threads monitor the containers and share packet information with the main thread 420. At block 418, the main thread processes the packets shared by the packet capture threads, which includes using the packet information shared at block 420. At block 422, thread shutdown and container cleanup is performed.

Figure 5:
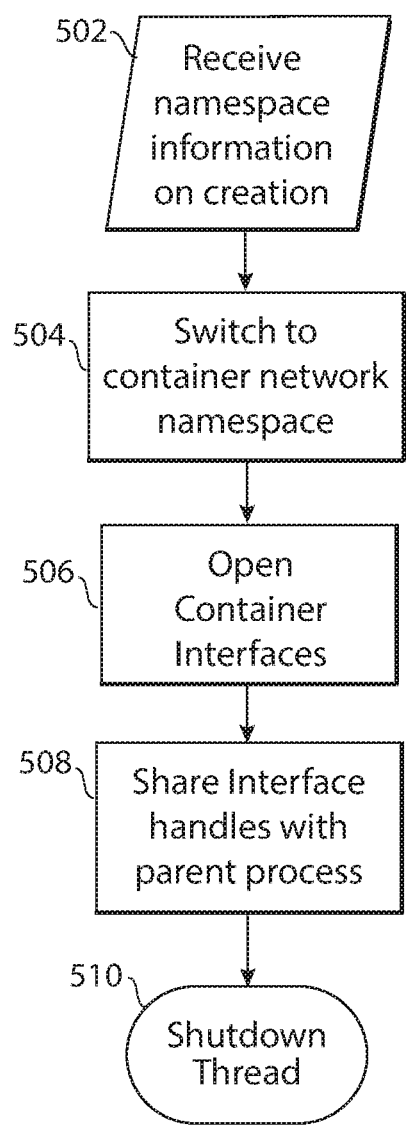
FIG. 5 is an example flowchart showing an example method performed by a main thread of the network monitoring application shown in FIG. 1, in accordance with one or more embodiments of the disclosure.
Figure 6:
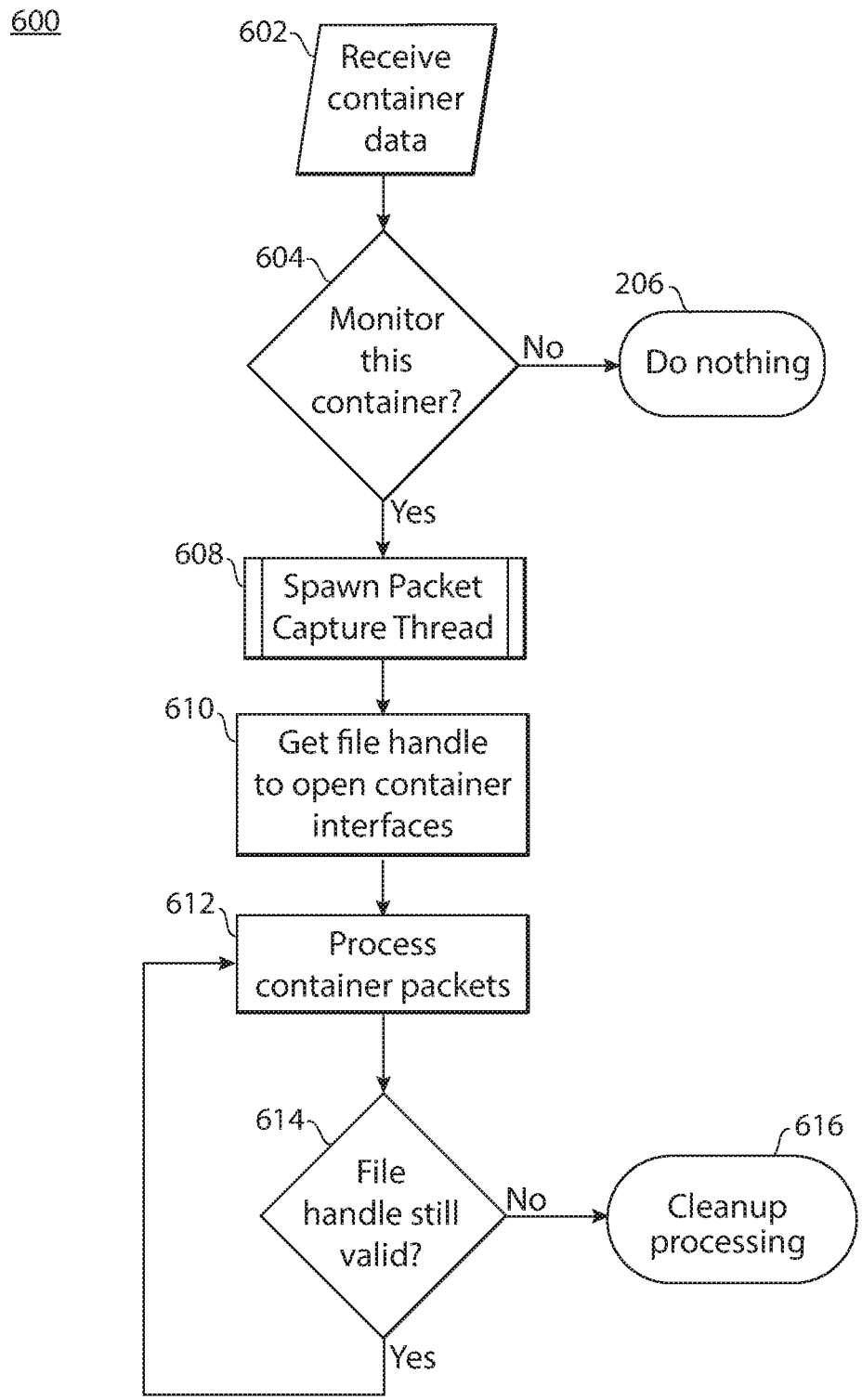
FIG. 6 is an example flowchart showing an example method performed by a spawned packet capture thread of the network monitoring application shown in FIG. 1, in accordance with one or more embodiments of the disclosure.

FIGS. 5 and 6 illustrate alternative one or more embodiments of the disclosure.

FIG. 5 shows a flowchart 500 of operations performed by a packet capture thread in accordance with one or more embodiments of the disclosure, such as packet capture thread 114 shown in FIG. 1. With reference to FIG. 5, at block 502, namespace information is received upon creation of the packet capture thread. At operation 504, the packet capture thread switches to the container network namespace. At block 506, the packet capture thread opens the container's interfaces, e.g., CNI 134 shown in FIG. 1. At block 508, the packet capture thread shares an interface handle for the container's interface with the main thread 508. At block 510, thread shutdown is managed as needed.

FIG. 6 shows a flowchart 600 of operations performed by a main thread in accordance with one or more embodiments of the disclosure, such as main thread 110 shown in FIG. 1. With reference to FIG. 6, at block 602, container data is received. This container data includes, for example and without limitation, the container name, user created labels for the container, container framework labels that identify a type of container, and the container namespace path. The labels would be the identifier for deciding whether to monitor the container.

At block 604, a determination is made whether the container is designated to be monitored (such as via user or system designation). If it is determined at block 604 that the container is not designated to be monitored, then at block 606 nothing is done. If it is determined at block 604 that the container is designated to be monitored, then at block 608 a packet capture thread is established. At block 610, a handle to open the container's interfaces is obtained.

The handle is obtained by opening a network interface for reading a captured packet. This could be any network interface, for example loopback 176 or external network interface 178 of pods 172 or host network interface 164 (shown in FIG. 1B). For example, this can be similar to a reference number created in Linux when a file is opened to associate actions with the correct open file. The reference number is supplied to interact with the open file and read its contents. The handle used at block 610 is a reference to a network interface device. When a packet capture library opens a captured packet for reading, there is a handle created to reference the open network interface device. The packet capture library can be integrated or accessed by the network monitoring application 102, and in some embodiments can be integrated or accessed by packet capture threads 116 (shown in FIG. 1A).

At block 612, the container packets are processed. For example, processing the container packets can entail generating smart data or statistics about network traffic, such as predictions or statistics related to packet counts or packet lengths.

At operation 614 a determination is made whether the file handle is still valid. If it is determined at operation 614 that the file handle is still valid, then the method continues at block 612. Else, if it is determined at operation 614 that the file handle is no longer valid, then at block 626 the cleanup processing is performed.

Figure 7:
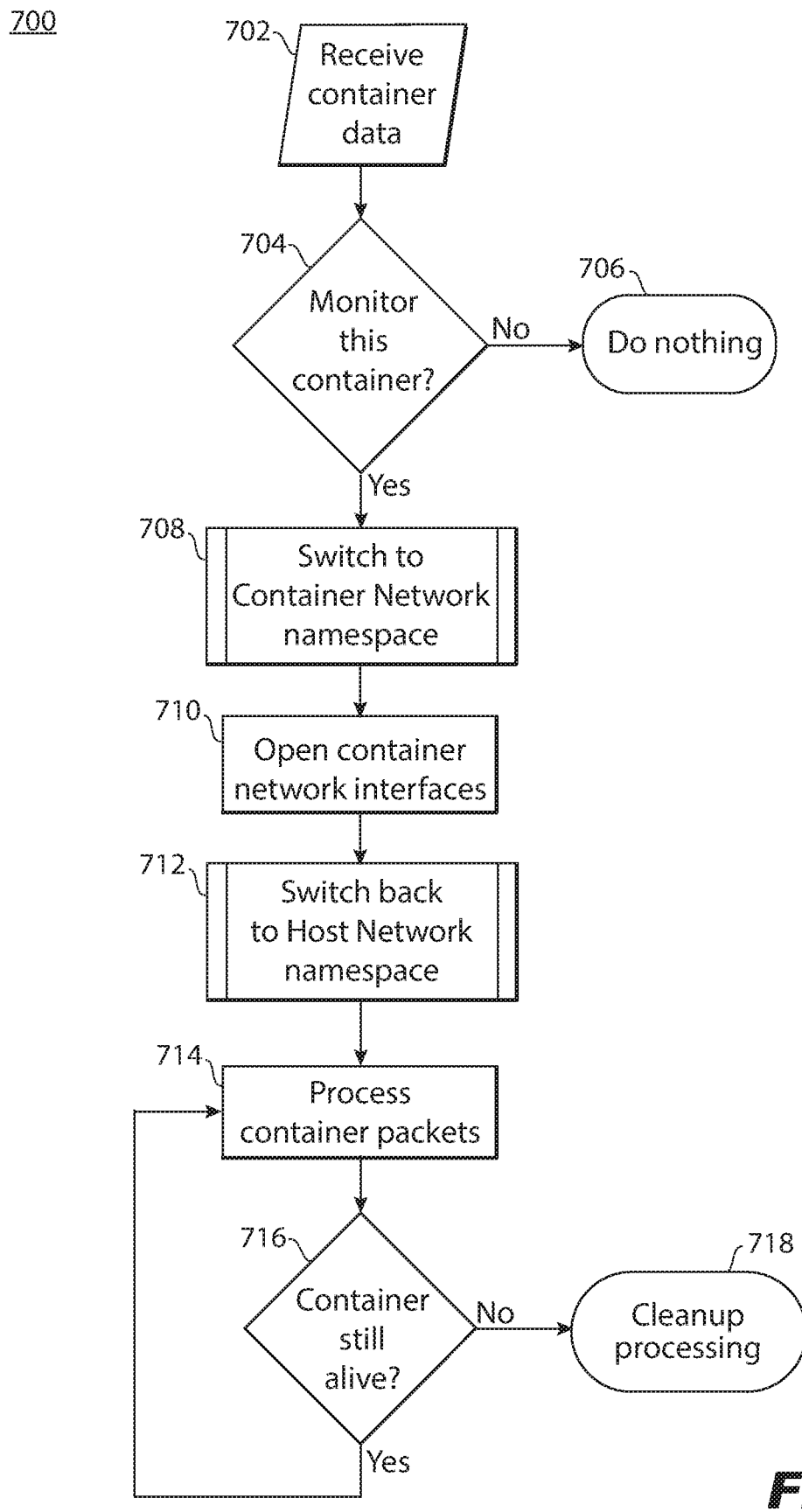
FIG. 7 is an example flowchart showing an example method performed by a main thread of the network monitoring application shown in FIG. 1, in accordance with further one or more embodiments of the disclosure.

FIG. 7 shows further alternative one or more embodiments of the disclosure. FIG. 7 shows a flowchart 700 of operations performed by a network monitoring application, such as network monitoring application 102 shown in FIG. 1. With reference to FIG. 7, at block 702, container data is received. At block 704, a determination is made whether the container is designated to be monitored (such as via user or system designation). If it is determined at block 704 that the container is not to be monitored, then the method continues at block 706, at which nothing is done. If it is determined at block 704 that the container is to be monitored, then at block 710 the main thread switches to the container network namespace 708. At block 710, while switched to the container network namespace, the container network interfaces are opened. At block 712, the main thread switches back to the original host network namespace (used prior to block 708). At block 714, the main thread processes the container packets. At block 716, a determination is made whether the container is still alive. If it is determined at block 716 that the container is still alive, then the method continues at block 714. If it is determined at block 716 that the container is no longer still alive, then at block 718 a cleanup process is performed 718.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the network monitoring application 102, container runtime 136, or network monitor processor 150 may be implemented or executed by one or more computer systems. For example, network monitoring application 102, container runtime 136, or network monitor processor 150 can be implemented using a computer system such as example computer system 800 illustrated in FIG. 8. In various embodiments, computer system 402 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 802 is only one example of a suitable system and is not intended to suggest any limitation as to the scope of use or functionality of embodiments of the disclosure described herein. Regardless, computer system 802 is capable of being implemented and/or performing any of the functionality set forth hereinabove.

Computer system 802 may be described in the general context of computer system-executable instructions, such as program modules, being executed by a computer system. Generally, program modules may include routines, programs, objects, components, logic, data structures, and so on that perform particular tasks or implement particular abstract data types. Computer system 802 may be practiced in distributed data processing environments where tasks are performed by remote processing devices that are linked through a communications network. In a distributed data processing environment, program modules may be located in both local and remote computer system storage media including memory storage devices.

Figure 8:
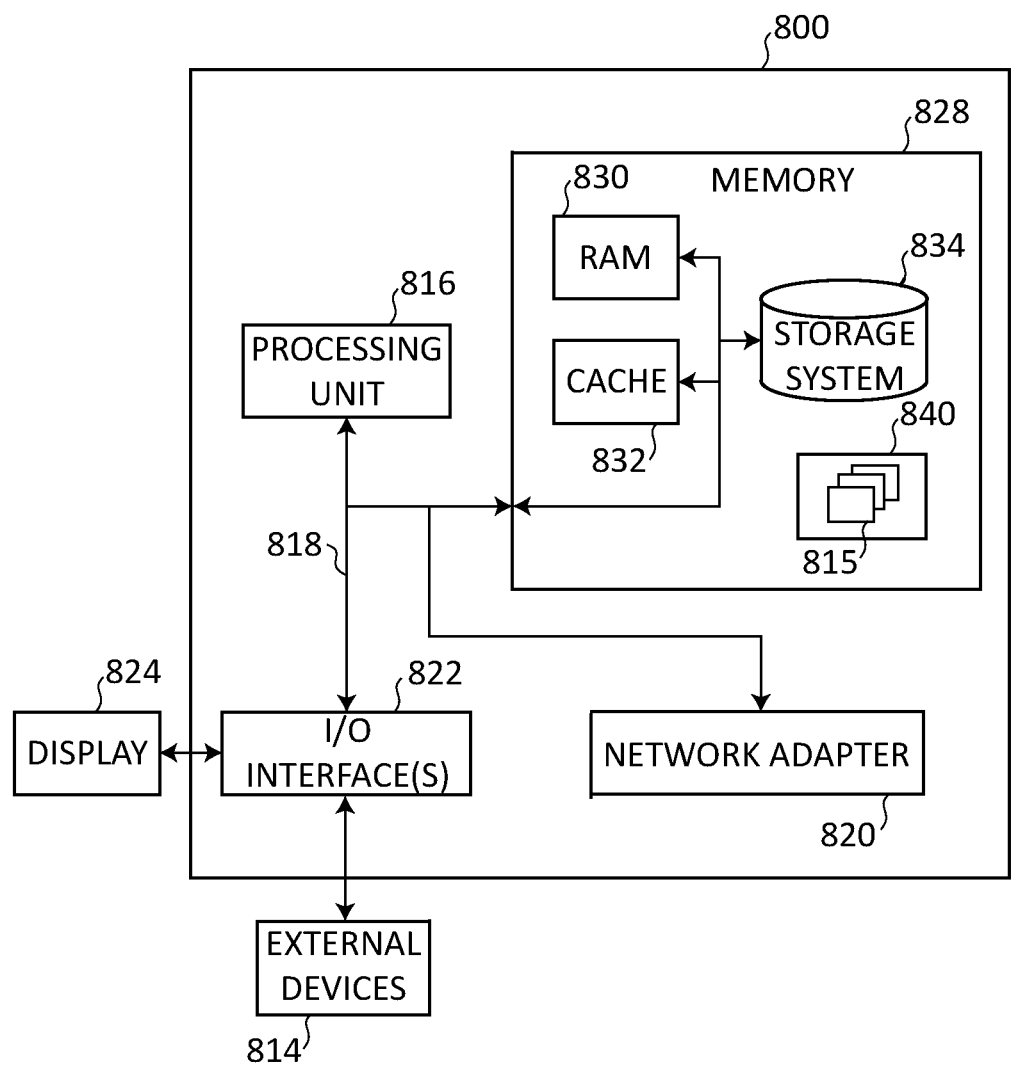
FIG. 8 illustrates an example computing system that could be used to implement a network monitoring processor or container runtime shown in FIG. 1.

Computer system 802 is shown in FIG. 8 in the form of a general-purpose computing device. The components of computer system 802 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 802 typically includes a variety of computer system readable media. Such media may be any available media that is accessible by computer system 802, and it includes both volatile and non-volatile media, removable and non-removable media.

System memory 828 can include computer system readable media in the form of volatile memory, such as random access memory (RAM) 830 and/or cache memory 832. Computer system 802 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the disclosure.

Program/utility 840, having a set (at least one) of program modules 815, such as computer system 802, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 815 generally carry out the functions and/or methodologies of embodiments of the disclosure as described herein.

Computer system 802 may also communicate with one or more external devices 814 such as a keyboard, a pointing device, a display 824, etc.; one or more devices that enable a user to interact with computer system 802; and/or any devices (e.g., network card, modem, etc.) that enable network monitoring application 102, container runtime 136, or network monitor processor 150 to communicate with one or more other computing devices. Such communication can occur via Input/Output (I/O) interfaces 822. Still yet, computer system 802 can communicate with one or more networks such as a local area network (LAN), a general wide area network (WAN), and/or a public network (e.g., the Internet) via network adapter 820. As depicted, network adapter 820 communicates with the other components of network system 100 via bus 818. It should be understood that although not shown, other hardware and/or software components could be used in conjunction with computer system 802. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by a protected device having a configured browser and a local verification device that is synchronized with a network verification device of a network protection device include immediate detection of requests sent by malware that is impersonating a browser and the ability to treat the request and traffic from the source of the request as illegitimate traffic without disturbing legitimate traffic. Accordingly, suspicious network activity attempting to mimic a web browser can be filtered from legitimate traffic.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A monitoring system for monitoring a container network interface (CNI) of a container network namespace, the container network namespace associated with one or more containers, wherein a container is an isolated execution environment, the monitoring system comprising:
at least one memory configured to store instructions; and
at least one processor disposed in communication with the at least one memory, wherein the at least one processor upon execution of the instructions is configured to:
provide a network monitoring application;
use the network monitoring application to determine a process ID associated with the one or more containers to determine a path to the container network namespace assigned to the container as established in a container runtime, wherein the network monitoring application receives, from a CNI plugin, the process ID, the CNI plugin comprising an application configured to exchange data between the one or more containers and the network monitoring application;
switch the network monitoring application from a host network namespace to the one or more container network namespace of the one or more containers;
use the network monitoring application to open the CNI of the container network namespace for allowing access to packets received or transmitted by the CNI; and
use the network monitoring application to access the packets.

2. The monitoring system according to claim 1, wherein the at least one processor is further configured to:

establish a main thread of the network monitoring application configured to receive the container network namespace assigned to respective established containers, the main thread being configured to:
dispatch a packet capture thread for selected containers of the established containers, wherein the respective packet capture threads are configured to switch to the container network namespace of the container for which they were dispatched; and
execute the respective dispatched packet capture threads.

3. The monitoring system according to claim 2,
wherein the respective packet capture threads are further configured to access the packets and share the packets with the main thread;
wherein the main thread is further configured to:
receive the packets accessed by the respective packet captured threads; and
process the packets.

4. The monitoring system according to claim 2, wherein the respective packet capture threads are further configured to open a container network interface of the container for which they were dispatched and provide a handle for accessing packets received or transmitted by the container network interface to the main thread; wherein the main thread is further configured to:
receive the handle provided by the respective packet captured threads;
using the handle received by the respective packet captured threads, access the packets received or transmitted by the container network interface; and
process the packets.

5. The monitoring system according to claim 2, wherein the main thread is included in the memory space of the at least one memory.

6. The monitoring system according to claim 2, wherein the main thread is further configured to share the packets with a remote central processor that monitors the packets.

7. The monitoring system according to claim 2, wherein the respective packet capture threads are further configured to shut themselves down when the container for they were respectively dispatched is no longer available.

8. The monitoring system according to claim 7, wherein the main thread is further configured to clean up the packet capture thread once it is shutdown.

9. The monitoring system according to claim 1, wherein the packet capture threads dispatched are all included in one memory space of the at least one memory.

10. The monitoring system according to claim 1, wherein the at least one processor is further configured to share the packets with a monitoring processor that monitors the packets.

11. The monitoring system according to claim 1, wherein the main thread is further configured to receive user input instructing the main thread which containers are selected and/or what to process in the packets.

12. The monitoring system according to claim 1, wherein the at least one processor is further configured to switch the network monitoring application from the container network namespace back to the host network namespace.

13. A method of monitoring a container network interface (CNI) of a container network namespace, the container network namespace associated with one or more containers, wherein a container is an isolated execution environment, the method comprising:

providing a network monitoring application;

determining, by the network monitoring application, a process ID associated with the one or more containers to determine a path to the container network namespace assigned to the one or more containers established in a container runtime, wherein the network monitoring application receives, from a CNI plugin, the process ID, the CNI plugin comprising an application configured to exchange data between the one or more containers and the network monitoring application;

switching, by the network monitoring application, from a host network namespace to the container network namespace of the one or more containers;

opening, by the network monitoring application, the CNI of the container network namespace for allowing access to packets received or transmitted by the CNI; and accessing, by the network monitoring application, the packets.

14. The method according to claim 13, further comprising:

establishing a main thread of the network monitoring application configured to receive the container network namespace assigned to respective established containers;

dispatching, by the main thread, a packet capture thread for selected containers of the established containers, wherein each packet capture thread is configured to switch to the container network namespace of the container for which it was dispatched; and executing, by the main thread, each dispatched packet capture thread.

15. The method according to claim 14, further comprising:

accessing, by the respective packet capture threads, the packets;

sharing, by the respective packet capture threads, the packets with the main packet capture thread; receiving, by the main thread, the packets accessed by the packet captured threads; and processing, by the main thread, the packets.

16. The method according to claim 14, further comprising:

opening, by the respective packet capture threads, a container network interface of the container for which it was dispatched;

providing, by the respective packet capture threads, a handle for accessing packets received or transmitted by the container network interface to the main thread;

receiving, by the main thread, the handle provided by the respective packet captured threads;

using, by the main thread, the handle received by the respective packet captured threads to access the packets received or transmitted by the container network interface; and process, by the main thread, the packets.

17. The method according to claim 14, further comprising shutting itself down, by the respective packet capture threads, when the container for it was dispatched is no longer available.

18. The method according to claim 17, further comprising cleaning up, by the main thread, the respective packet capture threads, once they are shutdown.

19. The method according to claim 13, further comprising sharing the packets with a monitoring processor that monitors the packets.

20. The method according to claim 13, further comprising receiving, by the main thread, user input instructing the main thread which containers are selected and/or what to process in the packets.

21. The method according to claim 13, further comprising switching the network monitoring application from the container network namespace back to the host network namespace.

* * * * *